Patented Sept. 1, 1925.

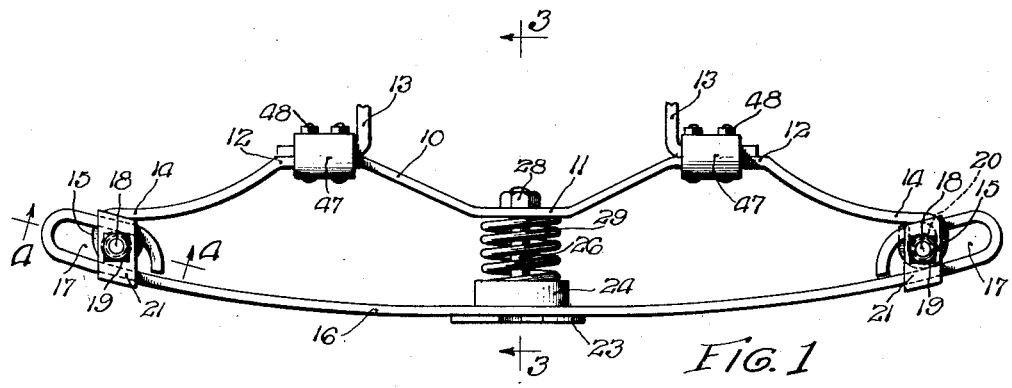
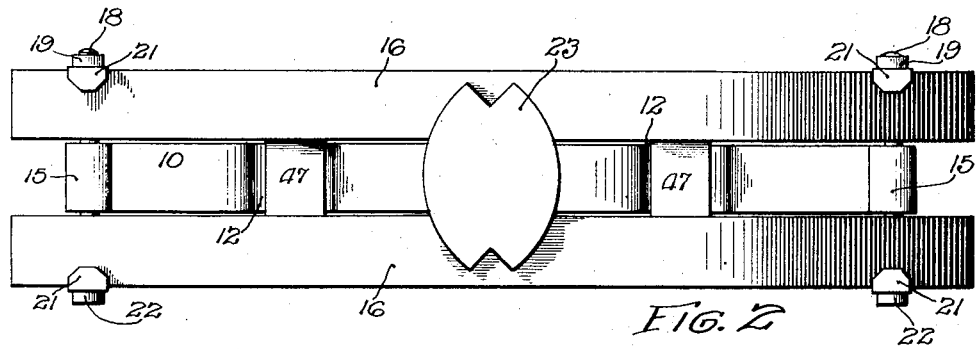
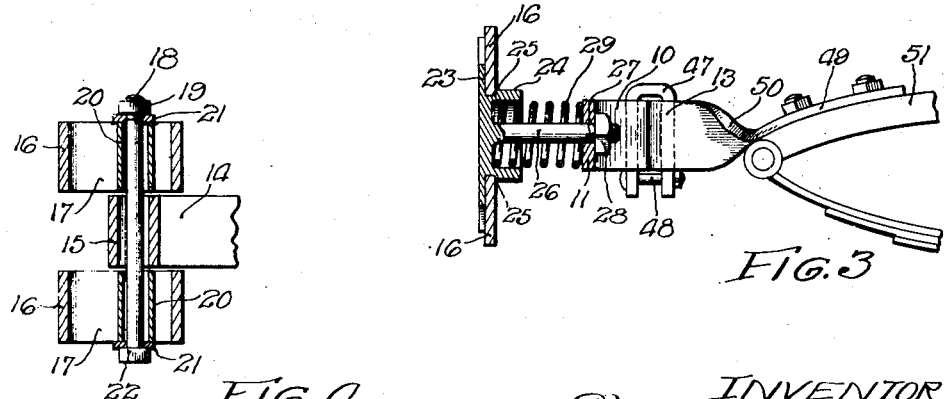

1,552,221

UNITED STATES PATENT OFFICE.

FRANK R. MIALKOWSKI, OF CHICAGO, ILLINOIS.

AUTOMOBILE BUMPER.

Application filed November 22, 1924. Serial No. 751,580.

*To all whom it may concern:*

Be it known that I, FRANK R. MIALKOWSKI, a citizen of the United States of America, residing at Chicago, in the county of Cook, State of Illinois, have invented certain new and useful Improvements in Automobile Bumpers, of which the following is a specification.

This invention relates to the automobile bumpers of the resilient bar type and its main object is to improve the structure of this class of bumpers.

Another object of the invention is to provide a bumper having front and rear resilient structures, both adapted to flex and to cooperate in producing maximum resiliency and impact absorbing qualities.

A further object of the invention is to provide a bumper of a number of parts which may be easily assembled and replaced when damaged.

A still further object of the invention is to provide a bumper of simple construction capable of easy and cheap manufacture.

A still further object of the invention is to provide improved and efficient connecting means for said front and rear resilient structures.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Figure 1 is a top plan view of the bumper in its preferred form;

Figure 2 is a front elevational view of the bumper;

Figure 3 is a side cross-sectional view on line 3—3 of Figure 1; and

Figure 4 is a longitudinal sectional view on line 4—4 of Figure 1,

Referring to the drawings there is shown a bumper comprising a rear plate 10 which at its central portion is bent forwardly forming projection 11. Intermediately of said projection and each end there are rearwardly diverging portions 12 to which brackets 13 connect by means of which the bumper is mounted to the frame of the vehicle. The ends 14 of the rear plate wind cylindrically and form sleeves 15.

The front plate of the bumper comprises two bars 16 of like construction which are in parallel relation, spaced apart vertically and in vertical alinement. The corresponding and opposite ends of said front bars loop rearwardly forming longitudinal slots 17 for the purpose presently explained.

In assembled position sleeves 15 and slots 17 remain in vertical alinement permitting insertion of bolts 18 therethrough, the upper ends of said bolts being threaded to receive nuts 19. As is apparent from the construction already explained a loose connection is provided between the ends of the rear plate and the corresponding ends of the front plate. Under the impact the ends 14 of the rear plate will be caused to flex and will spread longitudinally of the body of the plate, said ends being normally disposed forwardly. During this operation bolts 18 will slide within slots 17 and to reduce friction said bolts are provided with collars 20 which remain within slots 17. U-shaped plates 21 are interposed between bolt heads 22 and the lower edge of the lower bar 16 and between nuts 19 and the upper edge of the upper bar 16 and act as washers while the overlapping portion of said U-shaped plates afford guiding means during sliding movement of the bolts within slots 17 at the operation of the bumper.

A suitable tabular plate 23 abutting the front faces of bars 16 is provided at the central portion of said bars. A cup-shaped member 24 integrally formed with said plate projects rearwardly therefrom, and passes through the open space between bars 16. For holding the bars in parallel relation and to insure the simultaneous action of the said bars the cup-shaped member has two recesses or grooves 25 formed on its periphery adjacent to the rear face of said plate 23. Said grooves are horizontally and parallelly disposed permitting reception therein of the inner adjacent edges of bars 16.

Rod 26 integrally formed with the plate 23 and the cup-shaped member 24 and in central relation therewith, projects rearwardly and passes through aperture 27 formed in the adjacent portion 11 of the rear plate 10, within which the rod freely slides. Abutting the rear face of said plate 11 is a nut 28 in threaded engagement with the rear end of said rod. For the purpose of normally holding bars 16 away from plate 10 a coil spring 29 surrounding said rod is interposed between the bottom of the cup-shaped member 24 and the front face of the rear plate 10. Two or more convolutions of the coil spring are positioned within the said cup-shaped member and as the diameter of said coil spring equals the diameter of said cup-shaped member, said convolutions of the coil spring will remain in a frictional engagement with the inner surface of the cylindrical wall of said cup-shaped member. Thus any lateral displacement of said coil spring will be prevented.

From the construction hereinbefore described and more clearly shown on Figure 3 it will be apparent that the flexing action of even one of the bars 16 will be imparted to the other bar through the medium of the plate 23 and the cup-shaped member 24. The spring 29 will cause both of the bars to simultaneously assume normal position, owing to the fact that the cup-shaped member is at all times in a rigid engagement with both of said bars.

The bumper is attached to the vehicle by means of L-shaped brackets 13, the foot portions whereof being secured to the rearwardly diverging portions 12 of the rear plate 10 by means of U-shaped clamps 47 and bolts 48.

While there is described herein a preferred embodiment of the present invention, it is nevertheless to be understood that minor changes may be made therein without departing from the spirit and scope of the invention as claimed.

What I claim as new is:

1. A bumper comprising a rear impact plate, a sleeve at each end of said plate, a front plate embodying a pair of vertically spaced bars, bends at the opposite ends of each bar, said bends forming longitudinal slots, bolts passed through said sleeves and said slots, said bolts being adapted to make sliding movement within said slots on the operation of the bumper, collars upon said bolts interiorly of said slots facilitating the sliding movement of said bolts, and central resilient means associated with both of said plates for cushioning the same on operation of the bumper and for normally holding the plates apart from each other.

2. A bumper comprising a rear impact plate, a front plate embodying a pair of vertically spaced bars, loose connections between said rear impact plate and said front plate at each end thereof, a central tabular plate abutting the front face of said front plate, a cup-shaped member integrally formed with said central tabular plate, said cup-shaped member being disposed between said bars and passing rearwardly thereof, it having grooves on its periphery impinging the adjacent edges of said bars, a rod integrally formed with said central tabular plate and centrally disposed within said cup-shaped member, the rear end of said rod being loosely positioned in an aperture made in said rear impact plate, and a coil spring encircling said rod and interposed between the bottom of said cup-shaped member and said rear impact plate, the cylindrical wall of said cup-shaped member being adapted to frictionally engage the periphery of said spring at one of its ends preventing lateral displacement thereof.

3. A bumper comprising a rear impact plate, a sleeve at each end of said plate, a front plate embodying a pair of vertically spaced bars, bends at the opposite ends of each bar, said bends forming longitudinal slots, bolts passed through said sleeves and said slots, said bolts being adapted to make sliding movement within said slots on operation of the bumper, and collars upon said bolts interiorly of said slots facilitating the sliding movement of said bolts.

In testimony whereof I affix my signature.

FRANK R. MIALKOWSKI.